United States Patent
Zhao et al.

(10) Patent No.: US 9,149,064 B2
(45) Date of Patent: Oct. 6, 2015

(54) METHOD OF PRODUCING NANOFIBRILLAR CELLULOSE WITH HIGH ABSORPTIVITY TO FAT AND CHOLATE

(71) Applicants: Wei Zhao, Wuxi (CN); Jianxue Hu, Wuxi (CN); Ruijin Yang, Wuxi (CN)

(72) Inventors: Wei Zhao, Wuxi (CN); Jianxue Hu, Wuxi (CN); Ruijin Yang, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 0 days.

(21) Appl. No.: 14/257,923

(22) Filed: Apr. 21, 2014

(65) Prior Publication Data

US 2015/0173408 A1    Jun. 25, 2015

(30) Foreign Application Priority Data

Dec. 23, 2013 (CN) .......................... 2013 1 0716921

(51) Int. Cl.
  *A23L 1/05* (2006.01)
  *A23L 1/308* (2006.01)

(52) U.S. Cl.
  CPC .................................. *A23L 1/3082* (2013.01)

(58) Field of Classification Search
  CPC .................................................. A23L 1/3082
  USPC ................................................. 426/615, 573
  See application file for complete search history.

(56) References Cited

PUBLICATIONS

Henriksson, M. et al. 2007. European Polymer Journal. 43: 3434-3441.*

* cited by examiner

*Primary Examiner* — Hamid R Badr
(74) *Attorney, Agent, or Firm* — Lili Chen

(57) ABSTRACT

The invention provides a method for making nanofibrillar cellulose with high absorptivity to fat and cholate. According to the invention, dietary fiber material is activated by steam flash explosion and hydrolyzed sequentially by xylanase, laccase and cellulase. Nanofibrillar cellulose is obtained by subjecting the hydrolyzed fiber to high pressure homogenization. Nanofibrillar cellulose is further modified by octenyl succinic anhydride or glycidyl methacrylate to increase its ability to absorb fat and cholate. The method of the invention is safe, clean and environment-friendly. It avoids using toxic reagents, strong acids and bases in the process of preparing nanofibrillar cellulose, making it safe to be used as dietary products. The nanofibrillar cellulose made by the invented method has an oil absorption rate of 20-35 g/g, a water absorption rate of 20-30 g/g, expansivity of 40-70 mL/g, and sodium deoxycholate absorption rate of 0.01-0.2 mmoL/100 mg.

8 Claims, 1 Drawing Sheet

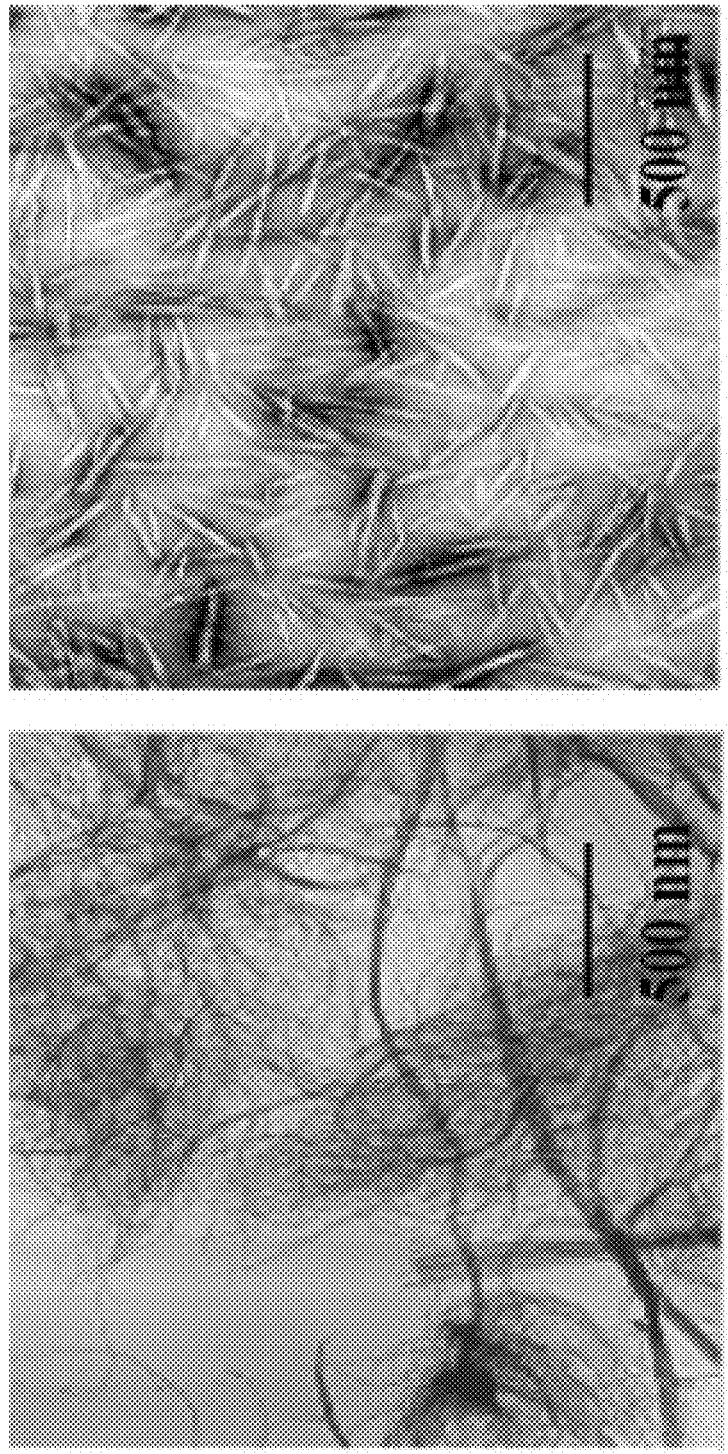

METHOD OF PRODUCING NANOFIBRILLAR CELLULOSE WITH HIGH ABSORPTIVITY TO FAT AND CHOLATE

CROSS-REFERENCES AND RELATED APPLICATIONS

This application claims the benefit of priority to Chinese patent application serial no. 201310716921.3, entitled "A method of producing nanofibrillar cellulose with high absorptivity to fat and cholate", filed Dec. 23, 2013, which is herein incorporated by reference in its entirety.

BACKGROUND OF THE INVENTION

1. Field of the Invention

The invention is in the field of food, pharmacy and health products development. The invention relates to a method of producing a nanofibrillar cellulose as a dietary fiber, especially a nanofibrillar cellulose with high absorptivity to fat and cholate.

2. Description of the Related Art

Dietary fiber plays an important role in maintaining the health of the digestive system and is also known as "the seventh nutrient". Dietary fiber has great water absorption capacity, can increase the volume of feces in intestinal tract, increase the transport rate of feces, and decrease the contact time between harmful substance and intestinal wall. Dietary fiber can also adsorb the harmful substances to facilitate their excretion. Research has shown that intake deficiency of dietary fiber has direct correlation with the incidences of carcinoma of large intestine. The size of a dietary fiber directly correlates with its function. Nanocellulose is in the scale of nanometer. The size of nanocellulose is usually in 20 to 50 nm, and the length of nanocellulose is 100 to 150 nm. Different from traditional microcellulose, the crystal structure of nanofibrillar cellulose is broken, the accessibility to surface molecules is increased, and a large quantity of hydroxyl groups are activated.

Currently, nanocellulose is used and developed rapidly in the polymer material field, however, there is no nanocellulose used as dietary fibers in food, medicine and health products. Compared with common dietary fibers, nanofibrillar cellulose has several benefits, such as larger specific surface area and higher accessibility. It has been reported that there is a close correlation between the size of dietary fiber and its physicochemical and physiological properties. The smaller the size of a dietary fiber, the bigger the capacity in water and lipid absorption. It is shown that the smaller size of dietary fiber can better increase wet weight of feces and fecal contents, improve defecation, and adsorb fat and cholate. Existing technologies for making nanocellulose fiber use toxic reagents, strong oxidants, strong acids and bases, which causes pollution to the environment. The nanocellulose fiber made from the existing technologies cannot be used as dietary products.

To destroy the crystalline structure of cellulose and activate/enhance the reactivity of cellulose, strong oxidants, strong acids and bases are often used to pretreat lignocelluloses in the production of macromolecule material—nanofibrillar cellulose. These chemical methods not only cause pollution to the environment, but also generate large amount of by-products. Nanofibrillar cellulose made by these methods cannot be used in food, medicine and health products.

The methods for preparation of nanofibrillar cellulose include physical methods, such as high pressure homogenization and chemical-mechanical method; chemical methods, such as acid hydrolysis, base hydrolysis and ionic liquid dissolution; and the method of electrospinning. Most of nanofibrillar celluloses are prepared by hydrolysis method using sulphuric acid. However, the sulphuric acid hydrolysis has a number of drawbacks, such as the generation of a large amount of waste acid and impurity in the production process, strict requirement for reaction equipment and difficulty in waste recycling. Compared with chemical hydrolysis method, the present invention has many advantages, such as mild reaction conditions, high specificity, safe production process, and usage of simple and safe raw reagents. Nanofibrillar celluloses made by the invented method can be used in food, medicine and health products.

The present invention uses steam flash explosion technique to activate cellulose fibers. The steam flash explosion not only removes most of hemicelluloses and part of lignin, but also effectively destroys the crystal structure of cellulose, which results in increased accessibility and reactivity in activated cellulose, making it ready for downstream enzymatic hydrolysis and further modification. Most dietary fibers are hydrophilic and not effective at absorbing oil and cholate from the mixture of oil and water. It is shown that the modification of surface hydrophobicity of nanocellulose using octenyl succinic anhydride or glycidyl methacrylate can improve absorptivity to oil and cholate, and the modified nanofibrillar cellulose can be used as dietary fibers in the food industry.

DETAILED DESCRIPTION

It is a goal of the present invention to provide a method for preparing a nanofibrillar cellulose with high absorptivity to oil and cholate. The present invention overcomes the shortcomings of traditional chemical methods for nanofibrillar cellulose preparation, which use strong acids, strong bases and toxic reagents in the preparation process, and produce nanofibrillar cellulose inefficient at adsorbing oil and cholate.

The preparation method comprises the following steps:
1) dietary fiber raw materials cut into the size of 3-5 cm are soaked in water until water-saturated, and activated by steam flash explosion. The operation parameters are as follows: steam pressure 0.5-2.0 MPa, residence time 0-20 minutes, and flash explosion time less than 0.1 second. The activated fibers are dried, smashed and sieved afterwards.
2) the activated fiber obtained in step 1) are washed by water at 60-80° C., and the water is removed by suction filtration. The activated fiber is sequentially hydrolyzed by xylanase, laccase and cellulase, and the hydrolysate is centrifuged and washed.
3) a small amount of water is added into the washed hydrolysate of step 2) to prepare a cellulose suspension. The cellulose suspension is dispersed by a high-speed disperser, and nanofibrillar cellulose is obtained by high pressure homogenization of the cellulose suspension;
4) the nanofibrillar cellulose obtained from step 3) is reacted with octenyl succinic anhydride or glycidyl methacrylate under weak alkaline condition to modify the surface hydrophobicity, thus obtaining the nanofibrillar cellulose with higher absorptivity to fat and cholate.

The modification conditions of step 4) are as follows: nanofibrillar cellulose is dispersed to a 2 to 30% (w/w) suspension and pH is adjusted to 7.0 to 11.0; 2-30% (w/w, based on cellulose dry weight) glycidyl methacrylate or octenyl succinic anhydride are added to the suspension, and the pH is maintained stable during the reaction; the reaction is terminated by decreasing pH to 3.0-7.0 after 2 to 15 hours of incubation. The substitution degree of the modified nanofibrillar cellulose is 0.001-0.07; the oil absorption rate is 20-30 g/g; the water absorption rate is 15-20 g/g; and the expansivity is 40-110 mL/g.

The enzymes used in the enzymatic hydrolysis of the step 2) are as follows: for hydrolysis with xylanase, the dosage of the enzyme is 20-100 U/g substrate, the temperature is 30-80° C., and the reaction time is 2-5 hours; for hydrolysis with laccase, the dosage of the enzyme is 20-120 U/g substrate, the temperature is 30-80° C., and the reaction time is 3-6 hours; for hydrolysis with cellulase, the dosage of the enzyme is 80-300 U/g substrate, the temperature is 40-70° C., and the reaction time is 5-20 hours.

For the high pressure homogenization treatment in the step 3), the operation pressure is 50-100 MPa and the homogenization process is repeated for 2-10 times.

The invention uses Steam Flash Explosion for pretreatment of the raw materials. The principle of Steam Flash Explosion is forcing high-pressure steam into molecular gaps or intracellular spaces of the raw materials in a high-pressure container, and quickly release the high pressure of the container at a supersonic speed (<8.75 msec), which leads to explosion of the materials into pieces and breakage of compact intramolecular and inter-molecular structures.

Comparing Steam Flash Explosion with other steam explosion techniques, the main difference lies at the quick and explosive release of the high density steam, which generates high impact and expansive forces that break structures of biomaterials. This method decreases the duration of materials in the high temperature and pressure environment. Moreover, this method solves the slow release problem in the traditional steam explosion technologies such as steam explosion, vapor explosion and steam ejection, which generates a large amount of by-products.

Compared with traditional dietary fiber, the modified nanofibrillar cellulose of the invention as a dietary fiber has many advantages. It is in nano-scale, has increased specific surface area, and has high absorptivity to body fat and cholate. As a dietary fiber, it can promote gastrointestinal health, increase the transport speed of intestinal contents through intestinal tracts, decrease absorption of body fat and synthesis of cholesterol, and reduce body weight.

The present invention combines the steam flash explosion and multiple enzymatic hydrolysis to remove most of hemicelluloses and part of lignin for preparation of nanofibrillar cellulose. The method is performed under mild conditions and causes little pollution to the environment. Unlike traditional chemical methods, the present invention avoids usage of strong acids, strong bases and toxic reagents in the preparation of nanofibrillar cellulose, making it possible to use the resulting nanofibrillar cellulose as a dietary product.

BRIEF DESCRIPTION OF THE DRAWINGS

FIG. 1: Nanofibrillar cellulose (left) and the microstructure of nanofibrillar cellulose (right).

EXAMPLES

Example 1

Preparation of Nanofibrillar Cellulose from Rice Straws

Rice straws of 3-5 cm length were soaked in water for a period of time, and treated with steam flash explosion at 1.6 MPa for 4.5 minutes. The treated straws were dried, smashed and sieved with a 40 mesh sieve. The smashed rice straws were washed twice with water at 80° C. for 1 hour and filtered with a suction filter. The filtrate was discarded and the remaining straws were hydrolyzed by xylanase at the concentration of 60 U/g substrate and incubated at 40° C. for 3 hours. The hydrolyzed product was washed with water and centrifuged for 3 times. The second hydrolysis used laccase at the concentration of 50 U/g substrate and incubated at 50° C. for 4 hours. The hydrolyzed product was then washed with water and centrifuged for 3 times, thus obtaining the crude cellulose residual. The crude cellulose residual was hydrolyzed by cellulase at the concentration of 150 IU/g dry straw powder, incubated at 60° C. for 12 hours, washed with water and centrifuged for at least 3 times. The hydrolyzed product was mixed with a small amount of water to form a suspension. The suspension was dispersed with a high speed disperser at the speed of $11 \times 10^3$ rpm for two minutes, and was then treated with high pressure homogenization at 60 MPa for 3 times, thus obtaining nanofibrillar cellulose. The nanofibrillar cellulose was mixed with water to make a 5% suspension and warmed up in a 40° C. water bath for half an hour, and pH was adjusted to 9.0. Octenyl succinic anhydride, which was diluted by dehydrated alcohol to a concentration of 6% of rice straw dry weight, was added to the nanofibrillar cellulose suspension drop by drop to modify the surface hydrophobicity. The pH was maintained at 9.0 by adding bases for six hours during the modification reaction. In the end, the pH was adjusted to 6.5 to terminate the reaction. The substitution degree of resulting nanofibrillar cellulose is 0.014, oil absorption rate is 25 g/g, water absorption rate is up to 28 g/g, expansivity is 25 mL/g, and absorption to sodium deoxycholate is 0.14 mmoL/100 mg.

Example 2

Preparation of Nanofibrillar Cellulose from Bran

Bran was soaked in water for a period of time, and treated with steam flash explosion at 2.0 MPa for 2.0 minutes. The treated bran was dried, smashed and sieved with a 40 mesh sieve. The smashed bran was washed twice at 60° C. for 2 hours and filtered with a suction filter. The filtrate was discarded and the remaining bran was hydrolyzed by xylanase at the concentration of 80 U/g substrate and incubated at 70° C. for 4 hours. The hydrolyzed product was then washed with water and centrifuged. The second hydrolysis used laccase at the concentration of 100 U/g substrate and incubated at 40° C. for 4.5 hours. The hydrolyzed product was washed with water and centrifuged, thus obtaining crude cellulose residual. The crude cellulose residual was hydrolyzed by cellulase at the concentration of 200 IU/g dry bran powder and incubated at 65° C. for 7 hours. The hydrolyzed product was washed with water and centrifuged for at least 3 times. The hydrolyzed final product was mixed with a small amount of water to form a suspension. The suspension was dispersed with a high speed disperser at the speed of $5 \times 10^3$ rpm for 3 minutes, and treated by high pressure homogenization at 100 MPa for 8 times, thus obtaining the nanofibrillar cellulose. The nanofibrillar cellulose was mixed with water to make a 3% suspension and warmed up in a 35° C. water bath for 30 minutes, and the pH was adjusted to 11.0. Octenyl succinic anhydride, which was diluted by dehydrated alcohol to a concentration of 4% of bran dry weight, was added to the nanofibrillar cellulose suspension drop by drop to modify the surface hydrophobicity. During the reaction, pH was maintained at 11 by adding bases for 8 hours. In the end, the pH was adjusted to 6.5 to terminate the reaction. The substitution degree of resulting nanofibrillar cellulose is 0.02, oil absorption rate is 30 g/g, water absorption rate is 20 g/g, expansivity is 55 mL/g, and absorption to the sodium deoxycholate is 0.14 mmoL/100 mg.

Example 3

Preparation of Nanofibrillar Cellulose from Corn Skins

Corn skins of 3-5 cm length were soaked in water for a period of time and treated with steam flash explosion at 0.9 MPa for 6 minutes. The treated corn skins were dried, smashed and sieved with a 40 mesh sieve. The smashed corn skins were washed twice at 60° C. for 2 hours and filtered with a suction filter. The filtrate was discarded and the remaining corn skin was hydrolyzed by xylanase at the concentration of 100 U/g substrate and incubated at 55° C. for 2 hours. The hydrolyzed product was washed with water and centrifuged to remove the water. The second hydrolysis used laccase at the concentration of 100 U/g substrate and incubated at 70° C. for 3 hours. The hydrolyzed product was washed and centrifuged, thus obtaining crude cellulose residual. The crude cellulose residual was hydrolyzed by cellulase at the concentration of 90 IU/g dry corn skin powder and incubated at 45° C. for 18 hours. The hydrolyzed product was washed and centrifuged for at least 3 times. The hydrolyzed final product was mixed with a small amount of water to form a suspension. The suspension were dispersed with a high speed disperser at the speed of $7 \times 10^3$ rpm for 3 minutes and treated by high pressure homogenization at 80 MPa for 8 times, thus obtaining nanofibrillar cellulose. The nanofibrillar cellulose was mixed with water to make a 7% suspension, warmed up in a 50° C. water bath for half an hour, and the pH was adjusted to 7.5. Octenyl succinic anhydride, which was diluted by dehydrated alcohol to a concentration of 8% of corn skin dry weight, was added to the nanofibrillar cellulose suspension drop by drop to modify the surface hydrophobicity. During the reaction, pH was maintained to be 7.5 by adding bases for 6 hours. In the end, the pH was adjusted to 6.5 to terminate the reaction. The substitution degree of the resulting nanofibrillar cellulose is 0.019, oil absorption rate is 25 g/g, water absorption rate is 22 g/g, expansivity is 60 mL/g, and absorption to sodium deoxycholate is 0.09 mmoL/100 mg.

Example 4

Preparation of Nanofibrillar Cellulose from Bean Dregs

Bean dregs were soaked in water for a period of time and treated with steam flash explosion at 1.2 MPa for 15 minutes. The treated bean dregs were dried, smashed and sieved with a 40 mesh sieve. The smashed bean dregs were washed twice at 70° C. for 2 hours and filtered with a suction filter. The filtrate was discarded and remaining bean dregs were hydrolyzed by xylanase at the concentration of 30 U/g substrate and incubated at 60° C. for 5 hours. The hydrolyzed product was washed and centrifuged. The second hydrolysis used laccase at the concentration of 40 U/g substrate and incubated at 55° C. for 5 hours. The hydrolyzed product was washed and centrifuged, thus obtaining the crude cellulose. The crude cellulose was hydrolyzed by cellulase at the concentration of 260 IU/g dry bean dreg powder and incubated at 55° C. for 8 hours. The hydrolyzed product was washed and centrifuged for at least 3 times. The hydrolyzed final product was mixed with a small amount of water to make a suspension. The suspension was dispersed with a high speed disperser at the speed of $9 \times 10^3$ rpm for 3 minutes and treated by high pressure homogenization at 60 MPa for 5 times, thus obtaining nanofibrillar cellulose. The nanofibrillar cellulose was mixed with water to make a 10% suspension and warmed up in a 45° C. water bath for 0.5 hour, and the pH was adjusted to 8.5. Octenyl succinic anhydride, which was diluted by dehydrated alcohol to a concentration of 15% of bean dregs dry weight, was added to the nanofibrillar cellulose suspension drop by drop to modify the surface hydrophobicity. During the reaction, pH was maintained at 8.5 by adding bases for six hours. In the end, the pH was adjusted to 6.5 to terminate the reaction. The substitution degree of the resulting nanofibrillar cellulose is 0.025, oil absorption rate is 35 g/g, water absorption rate is 17 g/g, expansivity is 71 mL/g, and absorption to sodium deoxycholate is 0.15 mmoL/100 mg.

Example 5

Preparation of Nanofibrillar Cellulose from Rice Straws

Rice straws of 3-5 cm length were dried, smashed and sieved with a 40 mesh sieve. The smashed rice straw was washed twice at 80° C. for 1 hour and filtered with a suction filter. Discard the filtrate and the activated rice straws were hydrolyzed by xylanase at the concentration of 80 U/g substrate and incubated at 60° C. for 4 hours. The hydrolyzed product was washed and centrifuged for 3 times. The second hydrolysis used laccase at the concentration of 75 U/g substrate and incubated at 50° C. for 5 hours. The hydrolyzed product was washed and centrifuged for 3 times, thus obtaining crude cellulose residual. The crude cellulose residual was hydrolyzed by cellulase at the concentration of 200 IU/g dry straw powder and incubated at 60° C. for 18 hours. The hydrolyzed product was washed and centrifuged for at least 3 times. The final hydrolyzed product was mixed with a small amount of water to make a suspension. The suspension was dispersed with a high speed disperser at the speed of $11 \times 10^3$ rpm for 3 minutes, and was treated by high pressure homogenization at 90 MPa for 3 times, thus obtaining nanofibrillar cellulose. The nanofibrillar cellulose was mixed with water to make a 2% suspension and warmed up in a 50° C. water bath for 0.5 hour, and the pH was adjusted to 8.0. Octenyl succinic anhydride, which was diluted by dehydrated alcohol to a concentration of 6% of rice straw dry weight, was added to the nanofibrillar cellulose suspension drop by drop to modify the surface hydrophobicity. During the reaction, the pH was maintained at 8.0 by adding bases for 4 hours. In the end, the pH was adjusted to 6.5 to terminate the reaction. The substitution degree of the resulting nanofibrillar cellulose is 0.009, oil absorption rate is 8 g/g, water absorption rate is 13 g/g, expansivity is 33 mL/g, and absorption to sodium deoxycholate is 0.02 mmoL/100 mg.

Example 6

Preparation of Nanofibrillar Cellulose using a Chemical Method

Christian Aulin et al. provided a method for making nanofibrillar cellulose. In their method, paper pulp was washed with water to obtain pulp fiber, and the pulp fiber was washed with dehydrated alcohol at a ratio of 11:100 (pulp fiber:dehydrated alcohol, v:v) for four times. The pulp fiber was then mixed with an isopropyl alcohol solution containing 0.2% monochloroacetic acid and incubated for 30 minutes. The mixture was filtered after the reaction to collect solid residuals. To perform a hydroxymethylation reaction, a mixture of sodium hydrate, methanol and isopropyl alcohol was preheated to below its boiling point, and the pulp fiber above was added to the preheated solution and kept mixing for one hour. After the reaction, the product was sequentially washed and filtered by deionized water, 0.1 moL/L acetic acid and deionized water. After the washing process, the solid products were added to 4% NaHCO$_3$ (wt/wt) and incubated without mixing for one hour. The solid products were washed again with water and subjected to high pressure homogenization at 165 MPa, which resulted in nanofibrillar cellulose.

In Christian's method, several organic solvents such as isopropyl alcohol and methanol, a strong base (e.g. sodium hydrate) and toxic reagents (e.g. monochloroacetic acid) were used to prepare nanofibrillar cellulose. Nanocellulose made by this method can only be used for chemical materials, but not for dietary products. In addition, large amount of water is needed to wash the product after the hydroxymethylation reaction (e.g. 2.8 liter of water is needed to wash 10 grams of paper pulp). Compared to other methods for making nanofibrillar cellulose, the present method is safe and environment-friendly. In addition, steam flash explosion treatment can activate the surface hydroxyl groups of raw materials, enabling further chemical modifications to make dietary nanocellulose products with improved property. An unique advantage of nanofibrillar cellulose made of the present method is that it is safe to be used as dietary products.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method of producing nanofibrillar cellulose with high absorptivity to fat and cholate, comprising the steps of:
    a) activating dietary fiber materials by steam flash explosion;
    b) hydrolyzing the activated dietary fiber materials in step a) sequentially by xylanase, laccase, and cellulase;
    c) performing high pressure homogenization to the hydrolyzed fiber in step b) to obtain a nanofibrillar cellulose; and
    d) modifying said nanofibrillar cellulose by octenyl succinic anhydride or glycidyl methacrylate to increase its absorption to fat and cholate.

2. The method of claim 1, comprising the steps of:
    a) soaking dietary fiber materials in water until saturation;
    b) activating said dietary fiber materials by steam flash explosion;
    c) hydrolyzing the activated dietary fiber materials sequentially by xylanase, laccase, cellulase after said activated dietary fiber materials are dried, smashed, sieved, and washed;
    d) washing the hydrolyzed fiber in step c) with water and collecting said hydrolyzed fiber by centrifugation;
    e) mixing said hydrolyzed fiber with water to make a cellulose suspension and dispersing said cellulose suspension in a high-speed disperser;
    f) performing high pressure homogenization to said cellulose suspension to obtain nanofibrillar cellulose;
    g) mixing octenyl succinic anhydride or glycidyl methacrylate to said nanofibrillar cellulose under weakly alkaline condition to obtain modified nanofibrillar cellulose with increased ability to absorb fat and cholate.

3. The method of claim 1, wherein said dietary fiber materials are selected from bean dreg, bean pulp, pericarp, cotton, bran, crop stalk and wood.

4. The method of claim 1, wherein conditions for performing hydrolyzation in step b) are as follows: for hydrolysis with xylanase, the dosage of the enzyme is 20-100 U/g substrate, the temperature is 30-80° C., and the reaction time is 2-5 hours; for hydrolysis with laccase, the dosage of the enzyme is 20-120 U/g substrate, the temperature is 30-80° C., and the reaction time is 3-6 hours; for hydrolysis with cellulase, the dosage of the enzyme is 80-300 U/g substrate, the temperature is 40-70° C., and the reaction time is 5-20 hours.

5. The method of claim 1, wherein said high pressure homogenization is operated at the pressure of 50-100 MPa for 2 to 10 times.

6. The method of claim 1, wherein said step d) comprises the steps of:
    1) dispersing said nanofibrillar cellulose to a 2 to 30% suspension and adjusting pH to 7.0 to 11.0;
    2) adding 2-30% (wt/wt, based on the dry weight of cellulose) glycidyl methacrylate or octenyl succinic anhydride to said nanofibrillar cellulose suspension and maintaining the stability of pH by adding bases for 2 to 15 hours; and
    3) terminating the reaction by decreasing pH to 3.0-7.0.

7. The method of claim 1, wherein steam pressure in step a) is 0.5-2.0 MPa, residence time is 0-20 minutes, and flash explosion time is less than 0.1 second.

8. The method of claim 1, comprising the steps of:
    a) activating dietary fiber materials by steam flash explosion, wherein steam pressure is 0.9 MPa, residence time is 3 minutes, and flash explosion time is less than 0.1 second;
    b) drying, smashing, sieving, and washing said activated dietary fiber materials;
    c) hydrolyzing said activated dietary fiber materials sequentially by xylanase (30 U/g substrate, 40° C., 3 hours), laccase (70 U/g substrate, 60° C., 5 hours) and cellulase (200 U/g substrate, 50° C., 9 hours);
    d) washing said hydrolyzed fiber in step c) with water and collecting said hydrolyzed fiber by centrifugation;
    e) mixing said hydrolyzed fiber with water to make a cellulose suspension and dispersing said cellulose suspension in a high-speed disperser;
    f) performing high pressure homogenization to said cellulose suspension at 60 MPa for 5 times to obtain nanofibrillar cellulose;
    g) Mixing 6% (wt/wt, based on dry weight of cellulose) octenyl succinic anhydride or glycidyl methacrylate to a nanofibrillar cellulose suspension (3%) at pH 9.0 to obtain modified nanofibrillar cellulose with increased ability to absorb fat and cholate.

* * * * *